United States Patent [19]

Umehara

[11] Patent Number: 4,940,965
[45] Date of Patent: Jul. 10, 1990

[54] VOCAL ALARM FOR OUTBOARD ENGINE

[75] Inventor: Kazuhiro Umehara, Hamamatsu, Japan

[73] Assignee: Suzuki Jidosha Kogyo Kabushiki Kaisha, Shizuoka, Japan

[21] Appl. No.: 222,183

[22] Filed: Jul. 21, 1988

[30] Foreign Application Priority Data

Jul. 31, 1987 [JP] Japan ................. 62-193237

[51] Int. Cl.⁵ ............................................. B60Q 1/00
[52] U.S. Cl. ..................................... 340/460; 340/517; 340/692
[58] Field of Search ................. 340/52 R, 52 D, 52 F, 340/59, 517, 518, 692, 519, 523, 460

[56] References Cited

U.S. PATENT DOCUMENTS 4,401,971 8/1983 Saito et al. ........................ 340/52 F
4,785,280 11/1988 Fubini et al. ..................... 340/52 F Primary Examiner—Joseph A. Orsino
Assistant Examiner—Jeffery A. Hofsass
Attorney, Agent, or Firm—Flynn, Thiel, Boutell & Tanis

[57] ABSTRACT

A vocal alarm arrangement includes a plurality of sensors, including a sensor for detecting an abnormality in cooling water, a sensor for detecting an abnormality in an oil level, and the like, and also includes a voice outputting circuit to which outputs from the sensors are coupled and which displays abnormalities in a vocalized form, the outputs from the plurality of sensors being given a predetermined order of priority, and the signals from the sensors being processed in accordance with the specified order of priority so abnormalities are presented as alarms in a vocalized form according to such order priority.

2 Claims, 2 Drawing Sheets

VOCAL ALARM FOR OUTBOARD ENGINE

FIELD OF THE INVENTION

The present invention relates to a vocal alarm for an outboard engine and, more particularly, to a vocal alarm for an outboard engine which detects overheating of the engine and other abnormalities and which signals their presence vocally as an alarm.

BACKGROUND OF THE INVENTION

In a water-cooled outboard engine, it is known to have cooling water drawn in by means of a water pump provided within a gear case, to circulate it through a cylinder jacket, and to then discharge it from the system. The circulation of the cooling water stops if the suction inlet therefor becomes clogged or if the water pump breaks down, which would lead to overheating of the engine and thereby cause cylinder or piston damage.

Further, if a propeller with a smaller pitch than the standard value is used, or one with the standard pitch is used but with a small load, the engine speed can rise to an undesirable level, reducing the life of the engine to a remarkable extent.

Recently, a separate oiling type of outboard engine has become widely used. In such an outboard engine, when the level of the oil drops to a prescribed level or below, or when an oil filter becomes clogged, the operator must be warned in some way of the shortage of oil or clogging of the filter.

An alarm device for outboard engines is required from the above-described viewpoints.

A known alarm device for outboard engines is of a type which includes a control system for selectively suppressing ignition pulses to maintain the engine speed below a fixed value when the engine speed becomes too high because of the use of a propeller with a smaller pitch than the standard value or owing to the generation of cavitation during running. This system also controls the engine speed and at the same time generates an alarm for the operator by an alarming means such as a buzzer when the circulation of cooling water stops due to an abnormality generated in the cooling system of the engine, when the oil level drops to an alarming level in a separate oiling engine, or when the oil does not flow due to clogging of an oil filter.

However, an operator may not notice the operation of the system which inhibits excessive engine speed. With an alarming device in which a lamp or the like is lit to indicate that the excessive speed inhibition system is in operation, lighting of the lamp must be viewed by the operator for recognition,.thus meaning the operator will not take any immediate action to reduce the speed if the operator does not notice the lamp.

With an alarming device in which abnormalities or operation of the excessive speed inhibition system is indicated by a buzzer or by lighting a lamp, the operator may in fact promptly notice the buzzer or lamp, but find it impossible to quickly determine what abnormality is taking place. An object of the present invention is to provide a vocal alarm system for an outboard engine which is capable of obviating the aforementioned problems of the prior art, and which enables an operator to be promptly and clearly informed of the precise nature of an abnormality by outputting in a vocalized form an alarm specifying the nature of the abnormality, so as to make the operator promptly take suitable action.

SUMMARY OF THE INVENTION

To this end, the present invention provides a vocal alarm arrangement which includes a plurality of sensors, including a sensor for detecting an abnormality in cooling water, a sensor for detecting an abnormality in an oil level, and the like, and which includes a voice outputting circuit to which outputs from the sensors are coupled and which displays abnormalities in a vocalized form, the outputs from the plurality of sensors being given a predetermined order of priority, and the signals from the sensors being processed in accordance with the specified order of priority so abnormalities are presented as alarms in a vocalized form according to such order of priority.

BRIEF DESCRIPTION OF THE DRAWINGS

An embodiment of the present invention will be described below with reference to FIGS. 1 and 2, in which.

DETAILED DESCRIPTION

Figure 1:
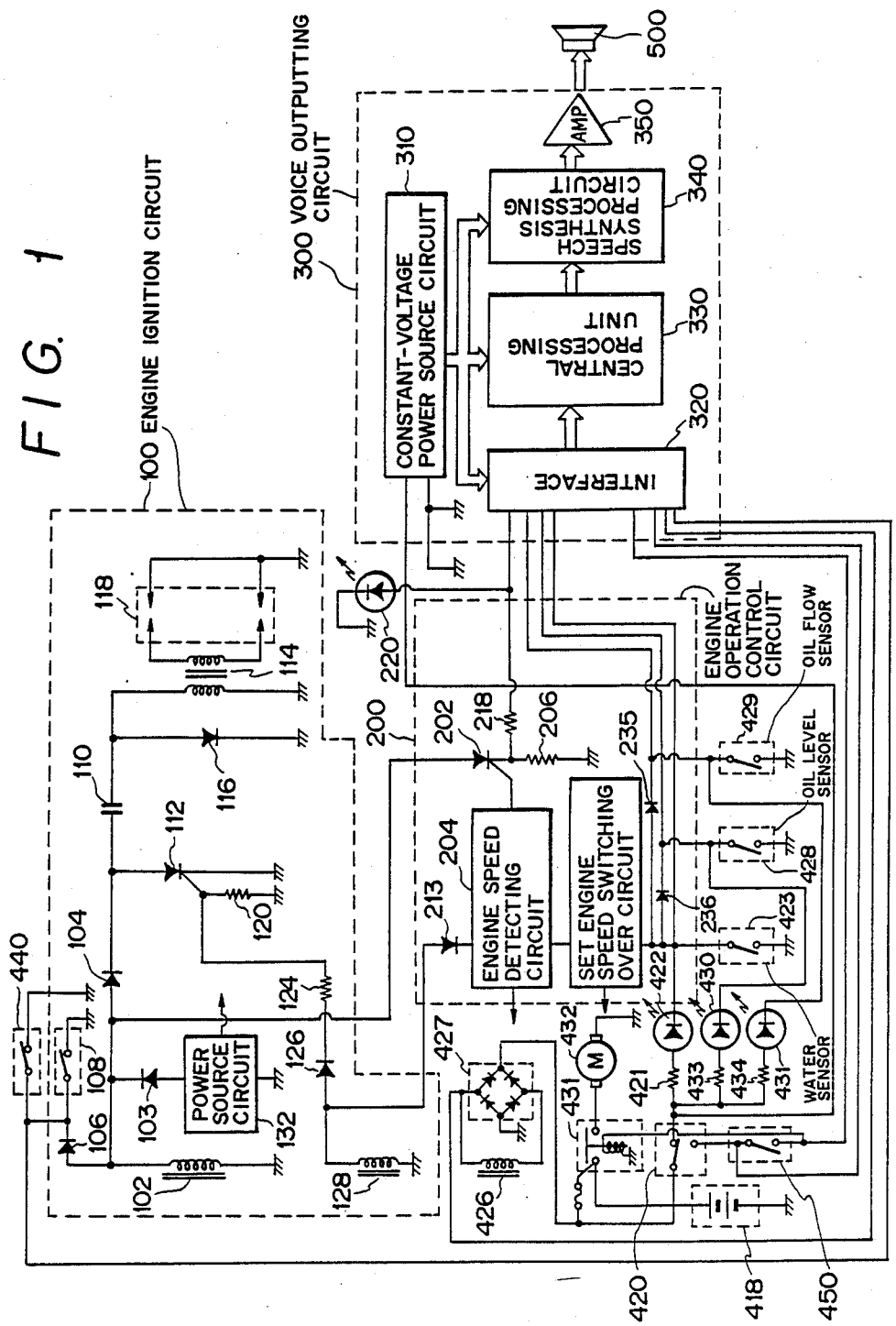
FIG. 1 is a schematic block diagram of a circuit embodying the present invention.

In FIG. 1, 100 is an engine ignition circuit, 200 is an engine operation control circuit, 300 is a voice outputting circuit, 423 is a water sensor, 428 is an oil level sensor, and 429 is an oil flow sensor.

The engine ignition circuit 100 is of a known type which includes a capacitor charging coil 102, a pulser coil 128, an ignition coil 114, and a spark plug 118.

The output of the capacitor charging coil 102 is connected to a charging capacitor 110 through a diode 104. It is also connected to a power source circuit 132 through a reverse-blocking diode 103 as well as to the anode of a thyristor 112. The capacitor charging coil 102 can be grounded through a diode 106 and switch 108. The output of the charging capacitor 110 is connected to ground through a diode 116 and the primary coil of the ignition coil 114.

The secondary coil of the ignition coil 114 is connected to the spark plug 118. The gate of the thyristor 112 is connected to ground through a resistor 120, and the output of the pulser coil 128 is input to the gate of the thyristor 112 through a diode 126 and resistor 124.

Thus, in the engine ignition circuit 100, when a conventional and not-illustrated rotor with a magnet thereon is rotated to start the engine, an electromotive force is generated in the capacitor charging coil 102, by which a current is caused to flow in a closed circuit formed through the diode 104, the charging capacitor 110, the diode 116, and ground, so as to charge up the charging capacitor 110.

Similarly, when the magnet rotor is rotated, an electromotive force is also generated in the pulser coil 128, by which a current is caused to flow in a closed circuit formed through the diode 126, the resistor 124, the resistor 120, and ground, so as to apply a voltage to the gate of the thyristor 112. When the gate voltage of the thyristor 112, which is determined by the resistor 120, reaches a trigger voltage, the thyristor is turned on.

This causes the charge stored in the capacitor 110 to be discharged by a circuit formed by the thyristor 112, ground, and the primary coil of the ignition coil 114, causing a current to flow in the primary coil of the ignition coil 114 and generating a high voltage in the secondary coil of the ignition coil 114 which is applied to the spark plug 118 to ignite it.

The above-described operation is conducted for every revolution of the magnet rotor, so as to enable the operation of the engine to be continued. If the stop switch 108 is turned on, the capacitor charging coil 102 is short-circuit through the diode 106, the stop switch 108 and ground, and the charging of the capacitor 110 is thereby inhibited, which inhibits ignition pulses to the spark plug 118.

Next, the engine operation control circuit 200 will be described. The engine operation control circuit 200 includes a thyristor 202 for adjusting the timing of the ignition to thereby adjust the engine speed, an engine speed detecting circuit 204 to which the output of the pulser coil 128 is input through a diode 213, a set engine speed switching over circuit 214 to which the output from the engine speed detecting circuit 204 is input to enable the set engine speed to be switched over if necessary, and diodes 235 and 236 for sending the output of the set engine speed switching over circuit 214 to the voice outputting circuit 300.

The speed detecting circuit 204 and speed switching over circuit 214 are known, and are not in and of themselves a part of the present invention. Therefore, they are not disclosed in detail herein. Suitable circuitry for these components is disclosed in copending U.S. Pat. No. 750 962 filed July 2, 1985, the disclosure of which is hereby incorporated herein by reference.

A water sensor 423, an oil level sensor 428, and an oil flow sensor 429 are provided in such a manner as to operate together with the set engine speed switching over circuit 214. The oil level sensor 428 is connected to the cathode of the diode 236, and the oil flow sensor 429 is connected to the cathode of the diode 235. The output of each of the sensors 423, 438, and 429 is fed to the voice outputting circuit 300, which will be described later.

The cathode of the thyristor 202 is connected to a light-emitting diode 220 through a resistor 218. The operating state of the thyristor 202 is also fed to the voice outputting circuit 300 which is to be described later.

The sensors 423, 428, and 429 are respectively provided with light-emitting diodes 422, 430, and 431 for displaying that they are in operation. Reference numeral 432 denotes a starter motor; 426 denotes a charging coil for a battery 418; and 427 designates a rectifier for rectifying the output of the charging coil 426. The starter motor 432 is connected to the battery 418 through a relay switch 431. Reference numeral 420 designates a main switch, and reference numeral 450 denotes a neutral switch. The exciting coil of the relay switch 431 is connected to the S terminal (START terminal) of the main switch 420 through the neutral switch 450. The two ends of the neutral switch are connected to an interface 320 of the voice outputting circuit which is to be described later.

The operation of the engine operation control circuit 200 is described below in connection with that of the engine ignition circuit 100.

First, excessive speed control of the engine and operation of the associated parts will be described.

If a propeller with a smaller pitch than the recommended value is used, if cavitation is caused during running, or if a boat having a marine engine is relatively small in weight, the engine speed can increase to an abnormal level. In this embodiment, the engine speed is controlled by selectively suppressing ignition pulses to the spark plug 118 when the speed rises to a predetermined speed or above, thereby preventing the engine from being operated at an excessive speed.

The engine speed is detected by the engine speed detecting circuit 204. More specifically, the electromotive force generated by the pulser coil 128 is a pulse whose duration is related to the engine speed. It is input through the diode 213 to the engine speed detecting circuit 204 so as to enable detection of the engine speed.

If the engine speed is lower than a predetermined value, no signal is output to the gate of the thyristor 202 from the engine speed detecting circuit 204. Therefore, the thyristor 202 stays off, and hence the engine operation control circuit 200 is not operated while the ignition circuit 100 is being operated in the manner described above.

If the engine speed rises to a value set for inhibiting excessive speed for any of the reasons described above, a signal is output to the gate of the thyristor 202 from the engine speed detecting circuit 204. Therefore, the thyristor 202 is turned on, thereby grounding the positive side of the capacitor charging coil 102 through the resistor 206. As a result, the charging of the capacitor 110 stops, and no current is caused to flow in the primary coil of the ignition coil 114, thereby stopping ignition pulses to the spark plug 118 and reducing the engine speed.

When the engine speed has been reduced to the predetermined value or below, the output of the signal from the engine speed detecting circuit 204 stops, and charging of the capacitor 110 is started again so as to resume supplying ignition pulses to the spark plug 118.

Thus, unless the reason which caused an increase in the engine speed is eliminated, the above-described operation is repeated so as to cause the engine speed to fluctuate around the set value.

At this time, part of the current that flows in the thyristor 202 is input to the light-emitting diode 220 and the voice outputting circuit 300 through the resistor 218. As a result, the light-emitting diode 220 is lighted to enable the operator to visualize and confirm that the excessive speed preventing system is in operation. At the same time, an instruction to reduce the engine speed is vocalized from a speaker 500.

Next, the operation which is conducted when an abnormality exists in the cooling water will be described.

If the circulation of the cooling water within the cylinder jacket stops during running for some reason, the water sensor 423 is turned on. In such a case, if the engine speed is higher than the speed set for the abnormality (3000 r.p.m. in this embodiment), the set engine speed switching over circuit 214 is actuated by the turning on of the water sensor 423 so that a signal is output to the engine speed detecting circuit 204 a certain time after the operation of the engine speed switching over circuit 214 has started (preferably between 2 and 5 seconds, which is varied in connection with the vocalized output of abnormalities). This causes the engine speed detecting circuit 204 to output a signal to the gate of the thyristor 202 so as to turn on the thyristor 202 and thereby shortcircuit the output of the capacitor charging coil 102.

Thus, the engine speed which is higher than 3000 r.p.m. is reduced to 3000.r.p.m. by the output of signals to the gate of the thyristor 202 from the engine speed detecting circuit 204, which continues to suppress sparks until the engine speed has been reduced to 3000 r.p.m.

When the water sensor 423 is turned on, the signal to the interface 320 of the voice outputting circuit 300 changes to low from high, by which the warning that the cooling water is abnormal is output in a vocalized form from the speaker 500. At this time, it takes some time (about 2 seconds) for the central processing unit 330 to confirm the fact that the cooling water has been abnormal before it outputs a signal representing the abnormality.

At the same time, a signal is input to the interface 320 from the cathode of the thyristor 202 through the resistor 218, by which an instruction to reduce the engine speed is vocalized, although this output is delayed until after a warning that the cooling water is abnormal has been vocalized. When the water sensor 423 is turned on, a current is caused to flow from the battery 418 through the main switch 420 and resistor 421 to the light-emitting diode 220 so as to light it and thereby enable the operator to also be visually informed of the abnormality in the cooling water.

When the level of the oil in an oil tank drops to a dangerously low level and the oil sensor 428 is thereby turned on or when the oil flow sensor 429 is turned on by the clogging of the oil filter, substantially the same operation is conducted as that done when the cooling water is abnormal.

Generally, a marine engine is provided with a safety mechanism such as a neutral switch, which inhibits the starter motor from being operated to start the engine when the gear mechanism is at a position other than its neutral position. Such a safety mechanism is often incorporated into a remote control box having a shift lever, and is turned on by the operation of the shift lever which places the gear mechanism at the neutral position.

Assuming that the gear mechanism is at the neutral position, the neutral switch 450 is on. Therefore, if the main switch 420 is set to START, a closed circuit is formed through the battery 418, the main switch 420, the neutral switch 450, and the exciting coil of the starter motor relay 431. This causes the contact of the starter motor relay 431 to be attracted to the exciting coil so as to close it. As a result, a current is caused to flow from the battery 418 to the starter motor 432 through the starter motor relay 431 so as to operate it and thereby start the engine.

As has been stated, the two ends of the neutral switch 431 are connected to the interface 320 of the voice outputting circuit so as to enable the central processing circuit to make a decision as to whether or not the gear mechanism is at its neutral position by checking the difference in potential across the two ends of the neutral switch 450. More specifically, if the gear mechanism is at the neutral position, the neutral switch is of course on (closed). Therefore, when the main switch 420 is set to START, no potential difference is generated across the two ends of the neutral switch 430, and the central processing circuit 330 thereby judges that the gear mechanism is at the neutral position on the basis of the signal from the interface and therefore outputs no signals. On the other hand, if the gear mechanism is at a position other than its neutral position, the neutral switch 430 is off (open). Therefore, when the main switch 420 is set to START, a potential difference is generated across the two ends of the neutral switch 430. This difference in potential is input to the interface 320, on the basis of which the central processing circuit 330 judges that the gear mechanism is at a position other than the neutral position, and outputs an instruction to return the gear to the neutral position in a vocalized form from the speaker 500.

In order to prevent a boat from running away from the operator if the operator has fallen in the water for some reason, a switch (an emergency switch 440) which is off while a cap is on its body and which is turned on when the cap is separated from it is connected in parallel to the stop circuit of the engine. The end of the cap is provided with a cord which is tied to the body of the operator during normal operation. With this switch, however, the cap may also be separated from the body for some reason by being hit by some other object or by the cord being pulled. If the operator tries to start the engine in this state, which corresponds to a state wherein the stop switch is on, no sparks are generated, so the engine does not start. Also, no sparks are generated and the engine does not start if the stop circuit is short-circuited, even when the cap is in place. When the starter motor is actuated in a state wherein the cap of the emergency switch 440 is displaced or wherein the stop circuit is short-circuited, the battery charging coil 426 produces an output by virtue of the rotation of the magnet rotor, and that output signal is input to the interface 320, by means of which the central processing unit 330 judges that the engine is being actuated.

At the same time, since a circuit connected to the cathode of the diode 106 is grounded, its interface side becomes low, and the central processing unit 330 thereby judges that the stop circuit is abnormal and causes the speaker 500 to vocalize it. The output of the battery charging coil 426 is also used when the voice outputting circuit 300 makes a judgement as to whether or not the engine is being actuated on the occasions when other decisions are being made.

Next, the voice outputting circuit 300 will be described. The voice outputting circuit includes a constant-voltage power source circuit 310, the interface 320, the central processing unit 330, a speech synthesis processing circuit 340, and an amplifier 350. The constant-voltage power source circuit 310 is adapted to adjust the input from the battery 418 to a fixed voltage level at which other circuits are operable and then supply the adjusted voltage thereto.

The interface circuit 320, CPU 330 and speech synthesis processing circuit 340 are all circuits of a type conventionally used for speech synthesis. Accordingly, since those of ordinary skill in the art are thoroughly familiar with these conventional circuits, and since these circuits are not in and of themselves a part of the present invention, the circuitry of these elements is not disclosed herein in detail.

The interface 320 serves to present the signals from the sensors in a form in which the central processing unit 330 can accept them. The central processing unit 330 performs various judgments and determines an order of priority using the signals from the interface 330, and delivers to the speech synthesis processing circuit 340 an output causing synthesizing of speech on the basis of the input signals. In accordance with the instruction from the central processing unit 330, the speech synthesis processing circuit 340 generates a required speech from the read-only-memory which contains audio signals, and delivers it to the amplifier 350. The speech is amplified by the amplifier 350 and is vocalized by the speaker 500 in a form which is audible to a human being.

The overall operation of the voice outputting circuit 300 of this embodiment, in particular the control operation of the central processing unit, will be described with reference to the flowchart of FIG. 2.

Figure 2:
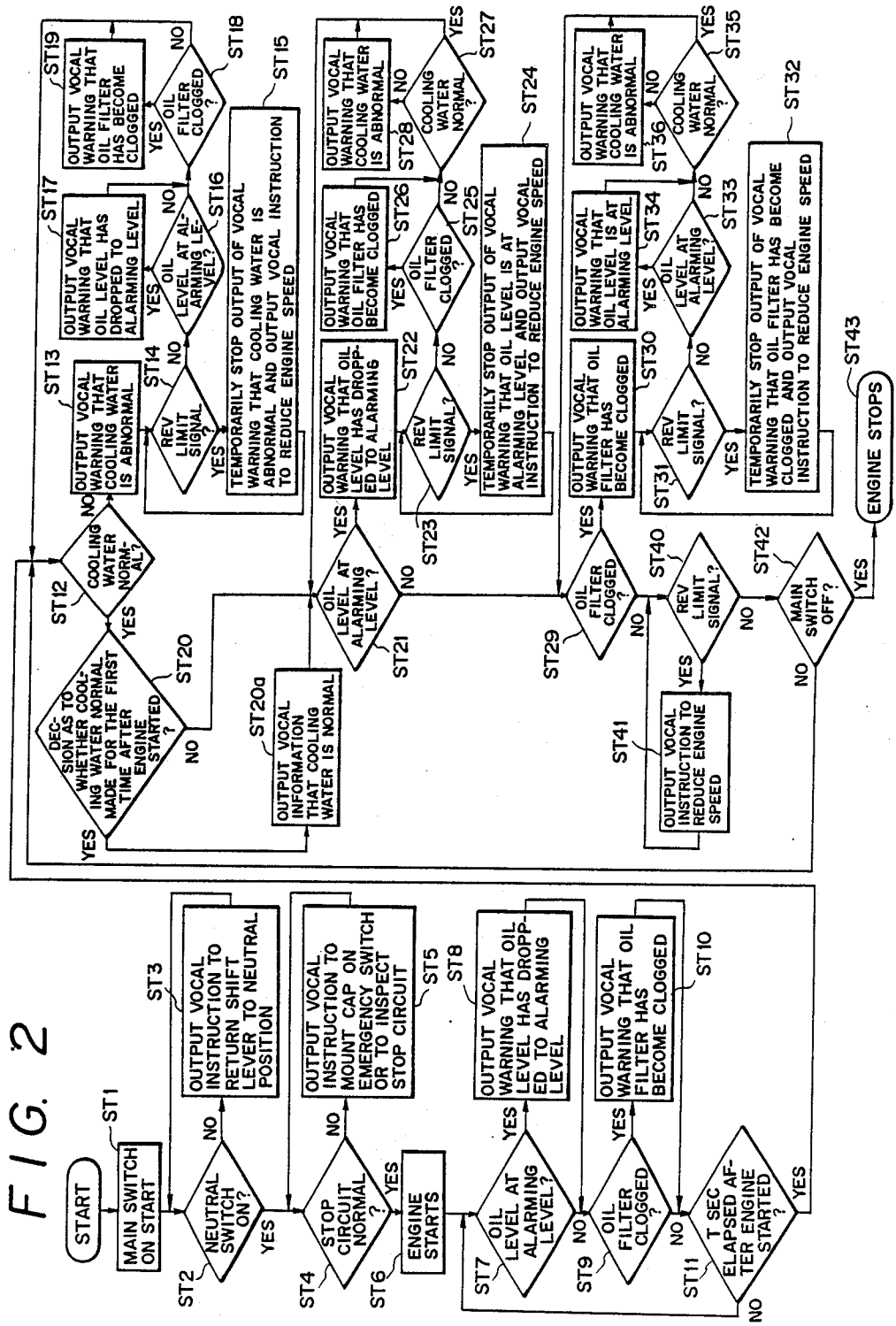
FIG. 2 is a flowchart showing the function of a voice outputting circuit which is a component of the circuit of FIG. 1.

In the flowchart shown in FIG. 2, the main switch (the ignition switch) is turned on (in ST 1) by the operator to start the engine. In step 2, it is determined whether or not the gear mechanism is at the neutral position. If the engine were to be started in a state wherein the gear mechanism was at a position other than the neutral position (for example at the forward or backward position), the boat would move suddenly, which is dangerous. Therefore, the neutral switch, which is on only while the gear mechanism is at the neutral position, is generally provided so as to inhibit the starter motor from operating while the gear mechanism is at a position other than the neutral position. The central processing unit determines if this neutral switch is on or off. If it is off, it judges that the gear is at the forward or backward position, and generates an instruction to return the gear to the neutral position in a vocalized form from the speaker (in ST 3). Therefore, the operator can be instantly informed of the reason why the starter motor does not operate, and this enables him or her to promptly return the gear mechanism to the neutral position. If the gear mechanism is located at the neutral position, the neutral switch is of course on. Therefore, the starter motor can be actuated at once so as to start the engine.

Once the starter motor is actuated in the manner described above, or manually, it is determined whether or not the cap of the emergency switch is displaced or whether or not the stop circuit is short-circuited for some reason (in ST 4). If the answer is no (abnormal), no sparks are generated and the engine does not start, and an instruction to place the cap of the emergency switch in position or to inspect the stop circuit is vocalized (in ST 5). This instruction is repeated until the short-circuited state is eliminated. Once the short-circuiting is eliminated or if the stop circuit is normal, the flow goes to subsequent processing.

Once the engine starts (in ST 6), the central processing unit determines whether or not the engine oil in the oil tank has dropped to an alarming level (in ST 7). If the answer is yes, the operator is informed of it in a vocalized form (in ST 8). After the vocal output, or if the answer is no, it is determined whether or not the oil filter is clogged (in ST 9). If the answer is yes, the central processing unit produces a warning that the oil filter has been clogged (in ST 10) in a vocalized manner. After the output of the warning, or if the answer is no, the flow goes to subsequent processing.

Next, it is determined whether or not T seconds have elapsed after the engine has started (in ST 11). If the answer is no, the flow returns to the processing in which it is determined whether the oil level has dropped to the alarming level. Thus, the decision as to whether or not the oil level has dropped to the alarming level and the decision as to whether or not the oil filter has become clogged are repeated until T seconds have elapsed after the engine started. Either of these two decisions may be made first. Once T seconds have passed and the answer has become yes, the flow goes to the processing in which it is determined whether or not the cooling water is normal (at ST 12).

The decision as to whether or not the cooling water is normal is made T seconds after the engine has started for the following reasons:

Marine engines are generally of the type in which seawater is sucked in by a pump to serve as cooling water and is circulated within the cylinder jacket before being discharged, unlike the case of cars in which a radiator contains the cooling water. Therefore, it takes a certain amount of time for the cooling water to reach the cylinder jacket after the engine is started. Therefore, in a case where the engine is started when it has been completely stopped for a period of time, T may be a time required for the cooling water to reach the cylinder jacket and fill it. On the other hand, it takes a much longer time for the cooling water to be discharged from the jacket and the water level to drop after the engine is stopped, as compared with a case wherein the cooling water is sucked. Therefore, in a case where the engine is restarted shortly after it has stopped and the cooling water has already circulated within the jacket, if the abnormality in the cooling water is determined using the time required for the cooling water to reach the cylinder jacket after a long stop, the judgement may be made in a state wherein cooling water from the prior operation still remains within the jacket. This may lead to generation of an erroneous instruction that the cooling water is normal, whereas in fact it does not come up from the intake owing to some problem. Therefore, in this embodiment, T is set to the time required for the level of the cooling water to drop below the position at which the sensor is mounted on the cylinder head after stopping the engine when cooling water has been circulated within the cylinder jacket.

If it is judged that the cooling water is normal (in ST 12), it is determined whether or not that decision was being made for the first time after the engine has been started (in ST 20). If the answer is yes, a vocalized information is output to inform the operator of the fact that the cooling water is normal (in ST 20a), so that the operator can be informed that the cooling water has started circulating within the cylinder jacket in a normal condition.

If it is judged that the cooling water is not normal, the operator is warned in a vocalized manner (in ST 13). This embodiment adopts a system in which the engine speed is if necessary reduced to and maintained below a certain value by selectively cutting out the ignition when the cooling water becomes abnormal, when the oil level drops to the alarming level, or when the oil filter becomes clogged, this engine speed control operation being started at least T seconds after the engine has been started, like the decision as to whether or not the cooling water is normal. After the warning that the cooling water is abnormal has been vocalized, it is determined (at ST 14) whether or not a rev limit signal flagging limiting of the engine speed is being generated (that is, whether or not control of the engine speed is in operation). If the answer is yes, the output of the warning that the cooling water is abnormal is temporarily stopped (in ST 15), and the operator is instructed to reduce the engine speed. The output of this instruction is repeated until the operator sufficiently returns the throttle to reduce the engine speed to a value set for abnormalities, or below.

The vocalized output of the warning that the cooling water is abnormal and the vocalized output of the instruction to reduce the engine speed have the following relationship: the decision as to whether or not the cooling water is normal is made T seconds after the engine has been started. To make this certain, the judgement that the cooling water is abnormal is made only after the sensor has been outputting for a certain time the signal representing the fact that no cooling water flow exists, and then the warning is accordingly vocalized. If the engine speed is higher than the value set for the abnormality when the signal representing the fact that no cooling water exists is output, the engine speed control is actuated. This control may be started the moment it has been judged that the cooling water is abnormal or a very short time after that judgement. The instruction to reduce the engine speed may be output in a vocalized form with respect to the vocalized output of the warning that the cooling water is abnormal, as follows. Although the engine speed control is started the moment it has been judged that the cooling water is abnormal and the warning has been accordingly vocalized, the instruction to reduce the engine speed may be output after the warning of an abnormality in the cooling water has been output in a vocalized form at least once. Alternatively, the engine speed control can be started the moment the warning of abnormality in the cooling water has been output at least once or a short time after that, and the instruction to reduce the engine speed can be output in a vocalized form concurrently with the start of the engine speed control.

Which of these systems is adopted is a matter to be determined after taking into consideration various conditions.

Thus, when the engine speed is to be controlled because of an abnormality in the cooling water, the operator is first informed of the nature of the abnormality, then is given the instruction to reduce the engine speed. In this way, the reason why the engine speed must be reduced is clarified to the operator. This also applies to the oil level warning or oil filter clogging warning and the resulting instruction to reduce the engine speed.

If the engine speed becomes lower than the value set for the abnormality as a result of the operator returning the throttle valve, no rev limit signal is generated. Therefore, the result of the decision as to whether or not the rev limit signal exists becomes negative, and the flow then goes to subsequent processing. If the engine speed is lower than the set value and no rev limit signal exists when the warning that the cooling water is abnormal is output in a vocalized form, the flow immediately goes to subsequent processing.

Next, it is determined whether or not the oil level has dropped to an alarming level (in ST 16). If the answer is yes, a vocal warning is output to inform the operator of the fact that the oil level has dropped to the alarming level (in ST 17), and then the flow goes to subsequent processing. If the answer is no, the flow goes directly to subsequent processing. Whether the oil level warning is output or not, the flow goes to subsequent processing, in which it is determined whether or not the oil filter has become clogged (in ST 18). If the answer is affirmative, the vocal warning that the oil filter has become clogged is output (in ST 19), and then the flow goes to the processing in which it is determined whether or not the cooling water is normal. If the answer regarding clogging is no, the flow goes directly to that processing.

The vocalized output of warnings that the oil level has dropped to the alarming level, that the cooling water is abnormal, and that the oil filter has become clogged are repeated until these abnormalities are eliminated, at intervals which, at their minimum, are equal to the time required to vocalize the other two abnormalities. This enables all of the three abnormalities to be output when necessary.

In this embodiment, three abnormalities are detected. However, other abnormalities may also be vocalized. If the output of the same abnormalities is repeated and if there is a possibility of any of these warnings being generated at the same time, the warnings may each be vocalized at intervals which are longer than the time required to vocalize all warnings. This enables the frequency at which the vocal output is repeated to be reduced when the abnormal states are continued.

Once the cooling water becomes normal, the corresponding sensor of course outputs a signal which indicates that the cooling water is normal. As a result, the result of the decision as to whether or not the cooling water is normal becomes affirmative (normal), and the flow goes to subsequent processing, in which it is determined whether the decision regarding the state of the cooling water is being made for the first time after the engine has been started (in ST 20). If the answer is yes, the operator is informed in a vocalized manner of the fact that the cooling water is normal (in ST 20a). If it is determined that the warning is not the first one, the flow goes to a subsequent decision group represented by the decision as to whether or not the oil level has dropped to the alarming level (in ST 21).

If the answer is yes, the warning that the oil level has dropped to an alarming level is output in a vocalized form (in ST 22), then decisions regarding other abnormalities are made in succession (in ST 23, ST 25, and ST 27) and, as in the case of the decision as to whether or not the cooling water is abnormal, any detected abnormalities are output in a vocalized form. Also, if the engine speed is higher than the set value, the result of the decision as to whether or not the rev limit signal exists becomes affirmative (in ST 23). As a result, the vocal warning that the oil level has dropped to the alarming level is temporarily stopped, and an instruction to reduce the engine speed is vocalized (in ST 24). This instruction is generated only after the warning that the oil level has dropped to the alarming level has been output.

Once oil is added to the oil tank, the result of the decision as to whether or not the oil level has dropped to the alarming level becomes negative, and the flow goes to a decision group which is represented by the decision as to whether or not the oil filter has become clogged (in ST 29).

In this group, it is first determined whether or not the oil filter has become clogged (in ST 29). If the answer is yes, the same operations are conducted (in ST 30 to ST 36) as those conducted when it is judged that the cooling water is abnormal (ST 13 to ST 19) or that the oil level has dropped to the alarming level (ST 22 to ST 28). If it is judged that the oil filter is not clogged, it is then determined whether or not the rev limit signal is being generated (in ST 40). This decision is made to prevent a state in which the engine is operated at an excessive speed, unlike the case where the engine speed is limited when an abnormality is detected. Therefore, the set engine speed value should represent the maximum speed at which the engine can be operated without causing any problem involving the durability thereof. This means that there are two types of set engine speed, one to which the engine speed is reduced when an abnormality occurs and the other to which the engine speed is reduced to prevent an overspeed of the engine. The engine speed set to cope with any abnormality may be 3000 r.p.m., and the engine speed set to prevent overspeed of the engine may be 6000 r.p.m. These set engine speeds need not be limited to these specific values, but they may be other values set in accordance to the specification of the engine.

If it is judged (at ST 40) that the rev limit signal is being generated, it is judged that this is the rev limit signal generated to prevent the excessive speed of the engine, because no signal representing any abnormality exists, and the instruction to reduce the engine speed is immediately output in a vocalized form (in ST 41) to instruct the operator to return the throttle and thereby reduce the engine speed. This instruction is continuously output so long as the rev limit signal exists. If it is judged that no rev limit signal exists, the flow returns to the decision block (ST 12) representing the decision as to whether or not the cooling water is abnormal. Thereafter, the determination of abnormalities is repeated by this processing loop until the engine is stopped. The abnormalities to be detected are not limited to the above-described three items, but other desired items may be added, and the nature of any of the abnormalities is informed to the operator in a vocalized form when that abnormality occurs.

With the above-described arrangement and function according to the present invention, abnormalities generated in cooling water and the like during the operation of the outboard engine are presented in a vocalized form so that the operator is immediately informed of each abnormality and its nature. Further, in the present invention, a plurality of types of abnormalities are concurrently and continuously detected using a plurality of sensors, and the detection signals from the plurality of sensors are given an order of priority for vocalization. In consequence, even if two or more abnormalities are detected at one time, these can be displayed sequentially, enabling the operator to immediately take action. Furthermore, the detection signals are given an order of priority, as stated above, and this enables the operator to guess what abnormality is going to be vocalized next when one type of abnormality has been vocalized, and to take immediate action.

According to the invention, the detection signal from a sensor which is given priority is processed and that signal is presented in a vocalized form, and only thereafter is the signal from a sensor which is given subsequent priority processed and its signal then presented in a vocalized form, thereby eliminating any mixture of vocal messages. Further, there is a time between the two vocal displays during which no vocal output is made, and this facilitates the operator's recognition of the details of the speech.

According to the invention, detection signals from the sensors are repeatedly tested on the basis of a predetermined order of priority, so that the decision as to whether or not there is an abnormality can be made. This allows the operator to be immediately informed of the occurrence of an abnormality generated in any section of the outboard engine.

The embodiments of the invention in which an exclusive property or privilege is claimed are defined as follows:

1. A vocal alarm apparatus for an engine, comprising: a plurality of sensors for said engine which each produce a signal upon detecting a respective operational abnormality; and voice synthesizing means coupled to said sensors for producing in response to each said signal a respective synthesized vocal statement; wherein said voice synthesizing means includes prioritization means for checking said sensors in a predetermined sequence for the presence of a signal therefrom, for responding to detection of the presence of a signal from a first of said sensors by causing said voice synthesizing means to produce the vocal statement corresponding to said first sensor and for then resuming said checking of said sensors according to said predetermined sequence, for responding to detection of the presence of a signal from a second of said sensors by causing said voice synthesizing means to produce the vocal statement corresponding to said second sensor and for then resuming said checking of said sensors according to said predetermined sequence, and for responding to detection of the presence of a signal from a third of said sensors by causing said voice synthesizing means to repeatedly successively produce the vocal statement corresponding to said third sensor until said signal from said third sensor terminates and for thereafter resuming said checking of said sensors according to said predetermined sequence; wherein said prioritization means responds to detection of the presence of a signal from a fourth of said sensors by causing said voice synthesizing means to produce the vocal statement corresponding to said fourth sensor and by then resuming said checking of said sensors according to said predetermined sequence; wherein said predetermined sequence of checking said sensors includes a check for the presence of a signal from said third sensor immediately after the production by said voice synthesizing means of the vocal statement corresponding to each said sensor other than said third sensor; wherein said first sensor produces a signal in response to detection of a condition in which an oil level in the engine is below a predetermined level; wherein said third sensor produces a signal in response to detection of a condition in which the engine speed is being forcibly limited; wherein said fourth sensor produces a signal in response to detection of a condition in which a flow rate of the oil in the engine is below a predetermined rate; and wherein said predetermined sequence includes: a first subsequence in which, in the absence of a signal from any said sensor, said prioritization means successively cyclically checks in order said first sensor, said second sensor, said fourth sensor and said third sensor; a second subsequence in which, following detection of the presence of a signal from said first sensor and the production of the corresponding vocal statement, said prioritization means successively checks in order said third sensor, said second sensor and said fourth sensor, and then resumes said first subsequence with said check therein of said first sensor; a third subsequence in which, following detection by said prioritization means of a signal from said second of said sensors and the production of the corresponding vocal statement, said prioritization means successively checks in order said third sensor, said fourth sensor and said first sensor, and then resumes said first subsequence with said check therein of said second sensor; and a fourth subsequence in which, following detection by said prioritization means of a signal from said fourth sensor and the production of the corresponding vocal statement, said prioritization means successively checks in order said third sensor, said second sensor and said first sensor, and then resumes said first subsequence with said check therein of said fourth sensor.

2. An apparatus of claim 1; wherein said prioritization means includes means for causing said voice synthesizing means to produce a synthesized vocal statement indicating that the engine cooling water is normal in response to detection, during said check of said first sensor in said first subsequence, that for the first time since starting of the engine the temperature of the cooling water is within said predetermined temperature range.

* * * * *

UNITED STATES PATENT AND TRADEMARK OFFICE
CERTIFICATE OF CORRECTION

PATENT NO. : 4 940 965
DATED : July 10, 1990
INVENTOR(S) : Kazuhiro UMEHARA

It is certified that error appears in the above-identified patent and that said Letters Patent is hereby corrected as shown below:

Column 12, line 34; after "which" insert ---a temperature of cooling water for the engine is outside a predetermined temperature range; wherein said second sensor produces a signal in response to detection of a condition in which---.

Signed and Sealed this

Thirty-first Day of December, 1991

Attest:

HARRY F. MANBECK, JR.

*Attesting Officer*     *Commissioner of Patents and Trademarks*